United States Patent
Zhu

(10) Patent No.: US 12,349,130 B2
(45) Date of Patent: Jul. 1, 2025

(54) COVERAGE ENHANCEMENT METHOD

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 285 days.

(21) Appl. No.: 17/797,602

(22) PCT Filed: Feb. 5, 2020

(86) PCT No.: PCT/CN2020/074355
§ 371 (c)(1),
(2) Date: Aug. 4, 2022

(87) PCT Pub. No.: WO2021/155512
PCT Pub. Date: Aug. 12, 2021

(65) Prior Publication Data
US 2023/0362921 A1    Nov. 9, 2023

(51) Int. Cl.
*H04W 72/1268* (2023.01)

(52) U.S. Cl.
CPC ................ *H04W 72/1268* (2013.01)

(58) Field of Classification Search
None
See application file for complete search history.

(56) References Cited

U.S. PATENT DOCUMENTS

| | | | |
|---|---|---|---|
| 2015/0141000 A1 | 5/2015 | Yilmaz | |
| 2016/0094996 A1* | 3/2016 | Xiong | H04W 72/21 370/329 |
| 2017/0230985 A1* | 8/2017 | Yamada | H04W 72/23 |
| 2017/0303258 A1 | 10/2017 | Zhang et al. | |
| 2018/0098334 A1* | 4/2018 | Tie | H04W 72/12 |
| 2018/0352559 A1* | 12/2018 | Duet | H04W 72/542 |
| 2019/0082444 A1* | 3/2019 | Chen | H04W 4/46 |
| 2019/0141733 A1* | 5/2019 | Kim | H04W 72/0446 |
| 2019/0261247 A1* | 8/2019 | Wang | H04W 48/04 |
| 2019/0357286 A1 | 11/2019 | Pang et al. | |

(Continued)

FOREIGN PATENT DOCUMENTS

| | | |
|---|---|---|
| CN | 104469785 A | 3/2015 |
| CN | 108631824 A | 10/2018 |

(Continued)

OTHER PUBLICATIONS

International Search Report of International Application No. PCT/CN2020/074355 dated Nov. 2, 2020 with English translation, (2p).

*Primary Examiner* — Phirin Sam

(74) *Attorney, Agent, or Firm* — Arch & Lake LLP; Hao Tan; Shen Wang

(57) ABSTRACT

A coverage enhancement method is applied to a first terminal, and includes: determining data to be sent; and sending the data to be sent through a second terminal. The coverage enhancement method is applied to a first terminal, and includes: receiving first information sent by an assisting device, the assisting device is a device assists the first terminal with data transmission; receiving second information sent by a first network device; and carrying out merging processing on the first information and the second information.

14 Claims, 11 Drawing Sheets

(56) References Cited

U.S. PATENT DOCUMENTS

| | | | |
|---|---|---|---|
| 2020/0059923 A1* | 2/2020 | Lei | H04W 4/70 |
| 2020/0059982 A1* | 2/2020 | Li | H04W 76/14 |
| 2020/0137782 A1 | 4/2020 | Su et al. | |
| 2021/0211230 A1* | 7/2021 | Wu | H04L 1/0041 |
| 2021/0250131 A1* | 8/2021 | Fan | H04L 5/0055 |
| 2021/0314976 A1* | 10/2021 | Zhang | H04L 1/1861 |
| 2021/0337409 A1* | 10/2021 | Xue | H04W 52/0216 |
| 2021/0400528 A1* | 12/2021 | Li | H04W 28/04 |
| 2022/0167362 A1* | 5/2022 | Liu | H04W 72/542 |
| 2022/0245853 A1* | 8/2022 | Biemer | G06V 20/52 |
| 2024/0049270 A1* | 2/2024 | Su | H04L 5/0044 |

FOREIGN PATENT DOCUMENTS

| | | |
|---|---|---|
| CN | 109217989 A | 1/2019 |
| WO | 2015103728 A1 | 7/2015 |

* cited by examiner

300

400

500

COVERAGE ENHANCEMENT METHOD

CROSS REFERENCE TO RELATED APPLICATION

The present application is the U.S. National Stage of International Application No. PCT/CN2020/074355 filed on Feb. 5, 2020, the entire contents of which are incorporated herein by reference in their entireties for all purposes.

BACKGROUND

With continuous emergence of new Internet applications such as a new generation of AR/VR and vehicle-to-vehicle communication, higher requirements are placed on a wireless communication technology, which drives continuous evolution of the wireless communication technology to meet needs of the applications. At present, a cellular mobile communication technology is in an evolution stage of a new generation technology. An important feature of the new generation technology is to support flexible configuration of various service types. Because the different service types have different requirements for the wireless communication technology, for example, major requirements of an enhanced Mobile Broad Band (eMBB) service type mainly focus on large bandwidth and high speed. Major requirements of an Ultra Reliable Low Latency Communication (URLLC) service type mainly focus on high reliability and low latency; and major requirements of a massive Machine Type Communication (mMTC) service type focus on large number of connections. As a result, the new generation of wireless communication system needs a flexible and configurable design to support transmission of various service types.

In order to support the transmission of the various service types, performance of network coverage is important. In a case of dense network deployment, the coverage performance is better, but it will increase cost of an operator. In a case of sparse network deployment, the coverage performance is poor.

SUMMARY

The disclosure relates to the technical field of communication, in particular to a coverage enhancement method.

According to a first aspect of the disclosure, a coverage enhancement method is provided, and applied to a first terminal, including:
determining data to be sent; and sending the data to be sent through a second terminal.

According to a second aspect of the disclosure, a coverage enhancement method is provided, and applied to a second terminal, including:
obtaining data to be sent determined by a first terminal; and sending the data to be sent.

According to a third aspect of the disclosure, a coverage enhancement method is provided, and applied to a second network device, including:
determining first information, in which the first information and the second information are scrambled based on the same virtual cell identity, and the second information is sent by the first network device to the first terminal; and sending the first information to the first terminal.

According to a fourth aspect of the disclosure, a coverage enhancement apparatus is provided, and applied to a first terminal, including a processor and a memory for storing an executable instruction of the processor. Furthermore, when the processor executes the instructions the processor is configured to: determine data to be sent; and send the data to be sent through a second terminal.

According to a fifth aspect of the disclosure, a coverage enhancement apparatus is provided, and applied to a second terminal, including a processor and a memory for storing an executable instruction of the processor. Furthermore, when the processor executes the instructions the processor is configured to: obtain data to be sent determined by a first terminal; and send the data to be sent.

According to a sixth aspect of the disclosure, a coverage enhancement apparatus is provided, and applied to a second network device, including a processor and a memory for storing an executable instruction of the processor. Furthermore, when the processor executes the instructions the processor is configured to: determine first information, the first information and second information are scrambled based on the same virtual cell identity, and the second information is sent by a first network device to a first terminal; and send the first information to the first terminal.

It should be understood that the above general description and the following detailed description are for example and explanatory, and are not intended to limit the disclosure.

BRIEF DESCRIPTION OF THE DRAWINGS

Accompanying drawings here, which are incorporated in and constitute a part of this specification, illustrate examples consistent with the disclosure and together with the specification serve to explain the principles of the disclosure.

DETAILED DESCRIPTION

In order to improve the network coverage performance, the related art adopts a repeat transmission mode to enhance the network coverage performance. For example, through repeat transmission in a time domain, or diversity gain in a frequency domain is obtained through frequency hopping in the frequency domain, and performance of uplink coverage is improved. However, a method of repeat transmission in the time domain will lead to a low utilization rate of spectrum resources, and will also bring additional delay. In addition, currently in the design of the new generation of communication system, operating frequencies of many available frequency domain resources are high, resulting in further reduction of network coverage.

In order to solve problems existing in the related art, examples of the disclosure provide a coverage enhancement method.

Examples will be described in detail here, and examples of which are represented in accompanying drawings. When the following description refers to the accompanying drawings, the same number in different accompanying drawings represents the same or similar elements unless otherwise indicated. The implementations described in the following examples do not represent all implementations consistent with the disclosure. On the contrary, they are examples of an apparatus and a method consistent with some aspects of the disclosure as detailed in the appended claims.

Figure 1:
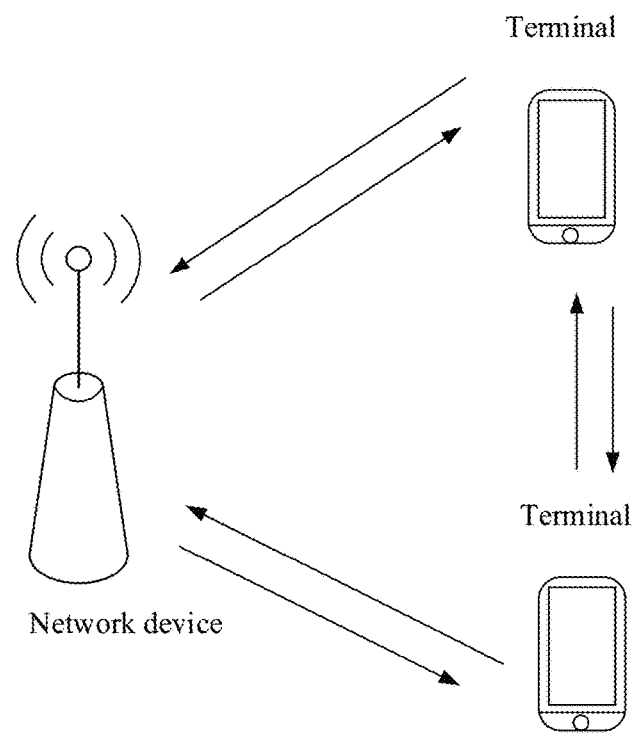
FIG. 1 is a schematic diagram of a wireless communication system shown according to an example.

A coverage enhancement method provided by an example of the disclosure may be applied to a wireless communication system shown in FIG. 1. Referring to FIG. 1, the wireless communication system includes a network device and a terminal. The terminal is connected with the network device through a wireless resource, and performs data transmission.

It may be understood that the wireless communication system shown in FIG. 1 is a schematic illustration, and the wireless communication system may further include other network devices, for example, may further include a core network device, a wireless relay device, a wireless backhaul device, etc., which is not drawn in FIG. 1. The example of the disclosure does not limit the number of the network device and the number of the terminal included in the wireless communication system.

It may be further understood that the wireless communication system according to the example of the disclosure is a network providing a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (single Carrier FDMA, SC-FDMA), and carrier sense multiple access with collision avoidance. The network may be divided into a 2G (generation) network, a 3G network, a 4G network or a future evolution network, such as a 5G network according to capacity, speed, delay and other factors of the different networks. The 5G network may also be called a new radio network (NR). For convenience of description, the disclosure sometimes refers to the wireless communication network simply as the network.

Further, the network device involved in the disclosure may also be called a radio access network device. The radio access network device may be: a base station, an evolved base station (evolved node B, base station), a femto, an access point (AP) in a wireless fidelity (WIFI) system, a wireless relay node, a wireless backhaul node, a transmission point (TP) or a transmission and reception point (TRP), etc., may further be a gNB in an NR system, or may further be a component or part of a device that constitutes a base station. It should be understood that a specific technology and a specific device form employed by the network device are not limited in the example of the disclosure. In the disclosure, the network device may provide communication coverage for a specific geographic region, and may communicate with a terminal located within a coverage region (cell). In addition, when the wireless communication system is a vehicle-to-everything (V2X) communication system, the network device may also be a vehicle-mounted device.

Further, the terminal involved in the disclosure may also be call a terminal device, user equipment (UE), a mobile station (MS), a mobile terminal (MT), etc., and is a device that provides voice and/or data connectivity to a user. For example, the terminal may be a handheld device and a vehicle-mounted device with a wireless connection function. At present, some examples of the terminal are: a smart mobile phone, a pocket personal computer (PPC), a palm computer, a personal digital assistant (PDA), a notebook computer, a tablet computer, a wearable device, or the vehicle-mounted device, etc. In addition, when the wireless communication system is the vehicle-to-everything (V2X) communication system, the terminal may also be the vehicle-mounted device. It should be understood that a specific technology and a specific device form employed by the terminal are not limited in the example of the disclosure.

Figure 2:
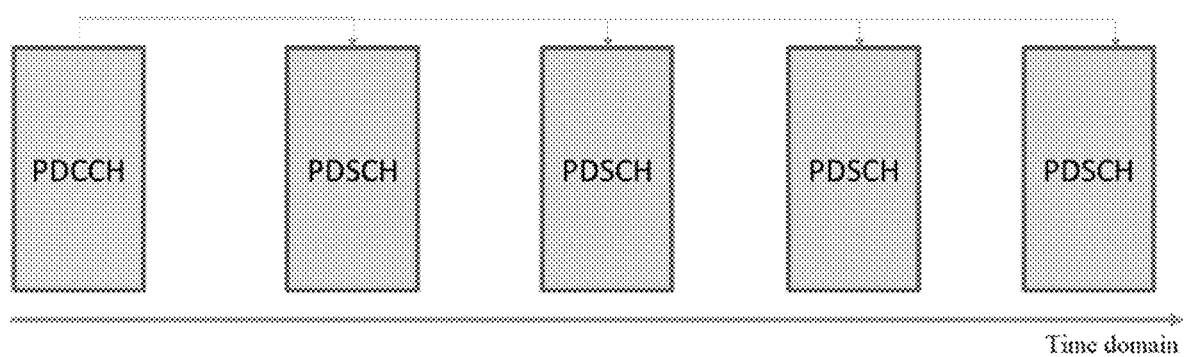
FIG. 2 is a schematic diagram of repeat transmission shown according to an example.
Figure 3:
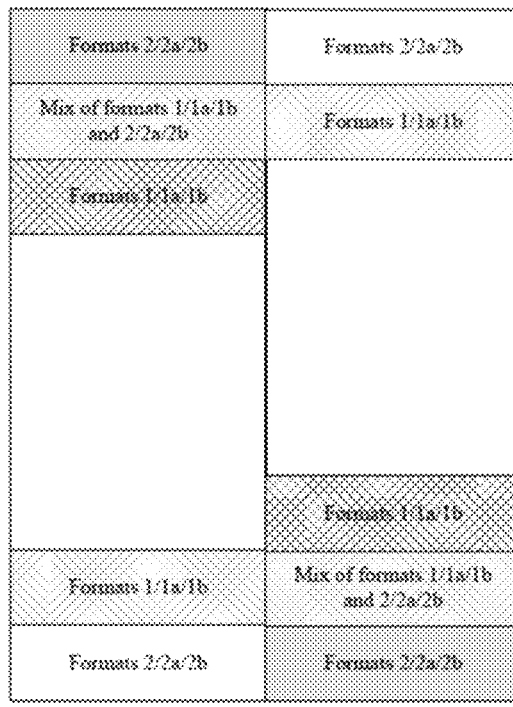
FIG. 3 is a schematic diagram of another repeat transmission shown according to an example.

In order to improve the network coverage performance, the related art employs a repeat transmission method. For example, FIG. 2 shows employment of a method of repeat transmission in a time domain. For example, in MTC and narrow band Internet of Things (NB-IoT), repeat transmission is employed to accumulate power, so as to achieve an effect of coverage enhancement. In simple terms, repeat transmission is transmission of the same transmission content for a plurality of time units. This time unit may be one or more subframes. For another example, diversity gain in a frequency domain is obtained through frequency hopping in the frequency domain through a mode shown in FIG. 3, and performance of uplink coverage is improved. For example, in a long term evolution (LTE) uplink physical uplink control channel (PUCCH) resource mapping method, reception performance of the PUCCH is improved by mapping the PUCCH on both sides of a frequency domain of an operating carrier, and the coverage performance is improved.

However, a method of repeat transmission in the time domain will lead to a low utilization rate of spectrum resources, and will also bring additional delay. In addition, currently in the design of the new generation of communication system, operating frequencies of many available frequency domain resources are high, resulting in further reduction of network coverage.

It is a feasible technical solution to improve coverage through coordination between the terminals, that is, for terminals with limited coverage, a cooperative terminal is configured to assist the terminal with the limited coverage in performing data transmission. The cooperative terminal is other terminals other than the terminal with the limited coverage. For convenience of description in the example of the disclosure, the terminal with the limited coverage is called a first terminal, and a terminal assisting the first terminal in information transmission is called a second terminal, which is also sometimes called the cooperative terminal.

Figure 4:
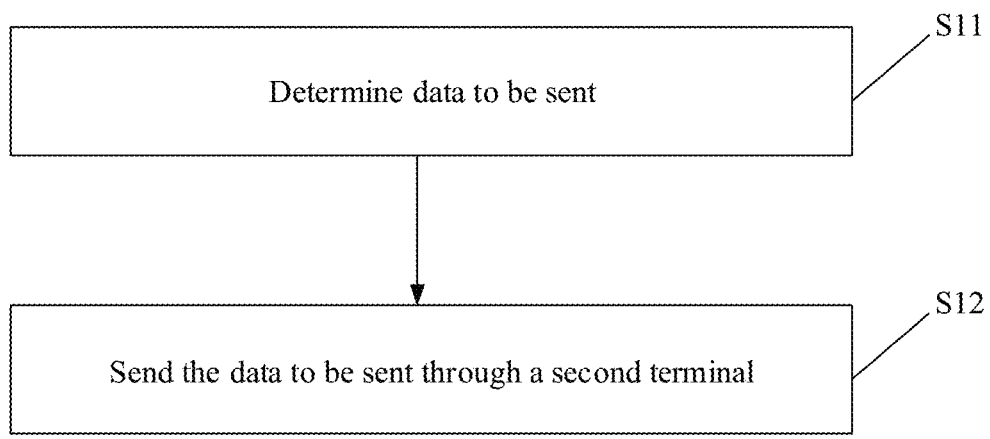
FIG. 4 is a flow diagram of a coverage enhancement method shown according to an example.

FIG. 4 is a flow diagram of a coverage enhancement method shown according to an example of the disclosure. Referring to FIG. 4, the coverage enhancement method is applied to the first terminal, and includes the following step S11 and step S12.

In step S11, data to be sent are determined.

In step S12, the data to be sent are sent through the second terminal.

In the example of the disclosure, in a scenario where coverage of the first terminal is limited, the data to be sent determined by the first terminal are sent through the second terminal, so as to realize cooperation between the terminals and improve uplink coverage performance.

In an implementation of the disclosure, the first terminal and the second terminal that cooperate with each other send data jointly. After receiving a scheduling instruction for scheduling uplink data sending, the first terminal selects the second terminal to jointly send the scheduled data.

Figure 5:
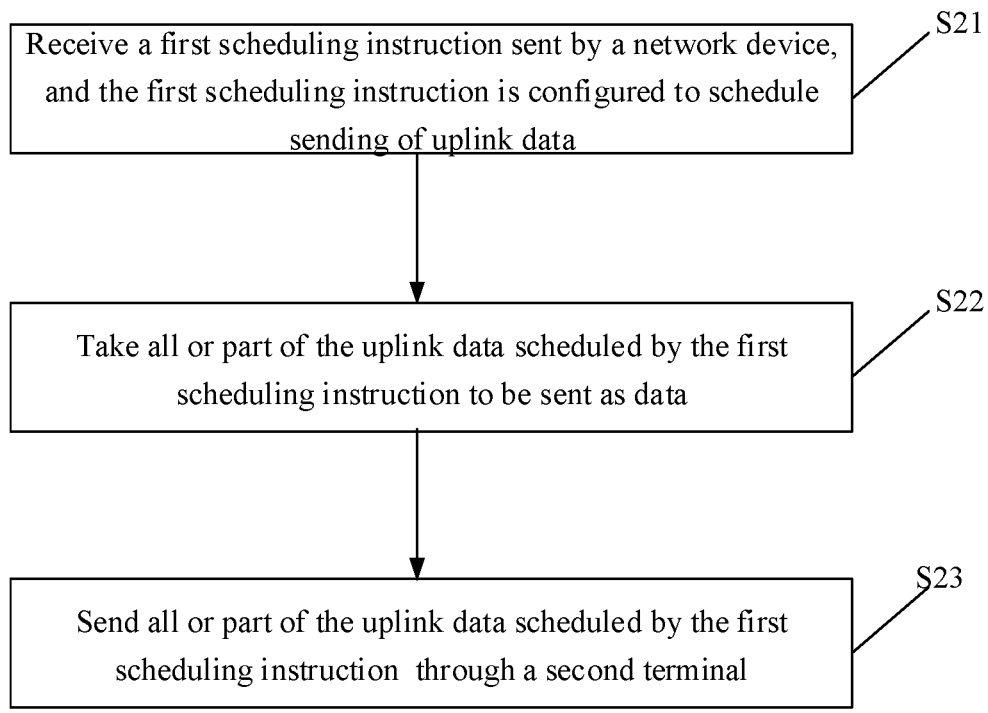
FIG. 5 is a flow diagram of another coverage enhancement method shown according to an example.

FIG. 5 is a flow diagram of a coverage enhancement method shown according to an example of the disclosure. Referring to FIG. 5, the coverage enhancement method is applied to the first terminal, and includes the following step S21 to step S23.

In step S21, a first scheduling instruction sent by a network device is received, and the first scheduling instruction is configured to schedule sending of uplink data.

In step S22, all or part of the uplink data scheduled by the first scheduling instruction are taken as data to be sent.

In step S23, all or part of the uplink data scheduled by the first scheduling instruction are sent through the second terminal.

In an implementation of the example of the disclosure, the first scheduling instruction is sent by the network device to the first terminal. In other words, the first terminal can receive the first scheduling instruction, but the second terminal cannot receive the first scheduling instruction. The first scheduling instruction further includes time-frequency resource location information for sending the data to be sent by the second terminal.

When the second terminal sends all or part of the uplink data scheduled by the first scheduling instruction, the first terminal sends all or part of the uplink data scheduled by the first scheduling instruction and the time-frequency resource location information to the second terminal, and the second terminal sends all or part of the uplink data scheduled by the first scheduling instruction based on the time-frequency resource location information included in the first scheduling instruction.

In another implementation of the example of the disclosure, both the first terminal and the second terminal receive the scheduling instruction of the network device. For convenience of description, it is called a second scheduling instruction. The second scheduling instruction is sent by the network device to the first terminal and the second terminal, and instructs the first terminal and the second terminal to jointly send the data to the network device. For example, the second scheduling instruction includes first indication information for instructing the second terminal to assist the first terminal in sending the data to be sent. For another example, the second scheduling instruction includes indication information for instructing the first terminal to send the uplink data to the network device.

When the second terminal sends all or part of the uplink data scheduled by the first scheduling instruction, the first terminal sends the data to be sent to the second terminal, and the second terminal sends the data to be sent based on the second scheduling instruction, so that the first terminal and the second terminal jointly send the data.

In another implementation of the example of the disclosure, all uplink data that needs to be sent by the first terminal are taken as the data to be sent and are sent with assistance of the second terminal.

Figure 6:
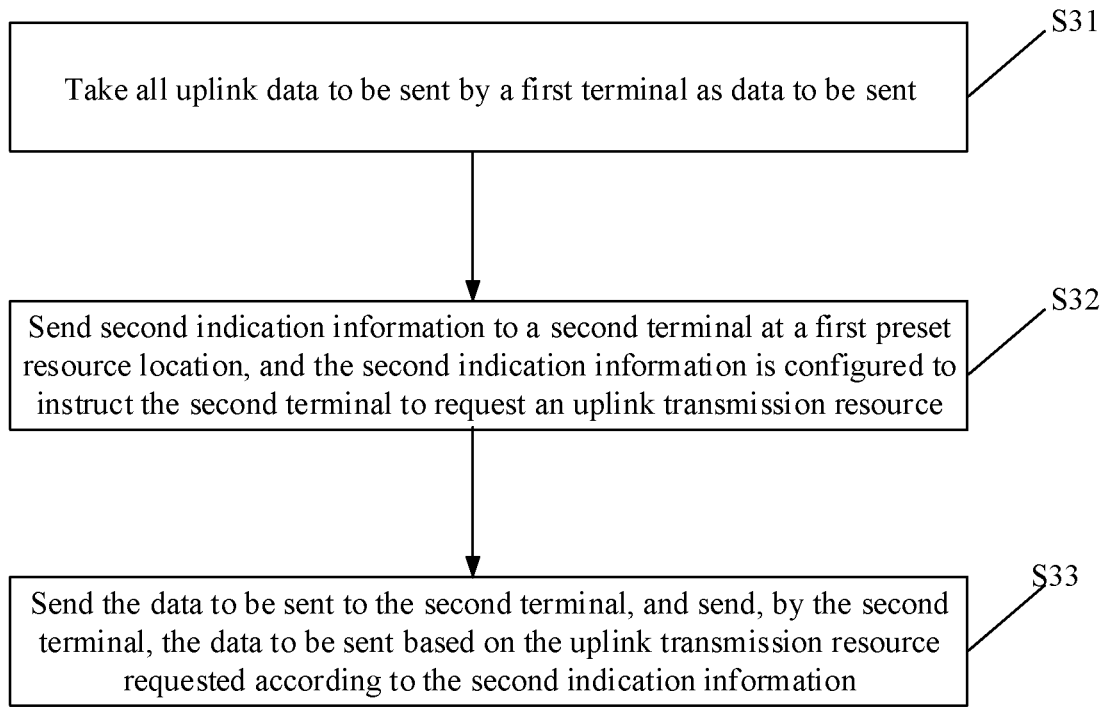
FIG. 6 is a flow diagram of yet another coverage enhancement method shown according to an example.

FIG. 6 is a flow diagram of a coverage enhancement method shown according to an example of the disclosure. Referring to FIG. 6, the coverage enhancement method is applied to the first terminal, and includes the following step S31 to step S33.

In step S31, all uplink data to be sent by the first terminal are taken as data to be sent.

In step S32, second indication information is sent to the second terminal at a first preset resource location, and the second indication information is configured to instruct the second terminal to request an uplink transmission resource.

In the example of the disclosure, when the first terminal has data to be transmitted, the first terminal sends indication information to the second terminal at a predefined resource location, so that the second terminal applies for the uplink transmission resource to the network device.

In step S33, the data to be sent are sent to the second terminal, and the second terminal sends the data to be sent based on the uplink transmission resource requested according to the second indication information.

In the example of the disclosure, the first terminal sends the data to be sent to the second terminal, and the second terminal sends the data of the first terminal at a resource location indicated in a scheduling signaling.

In another implementation, when the first terminal has the data to be sent, the first terminal may send the data to the second terminal at a predefined location. The second terminal may cache the uplink data of the first terminal. When receiving an uplink scheduling instruction, the first terminal may notify the second terminal and trigger the second terminal to forward the uplink data of the first terminal.

Figure 7:
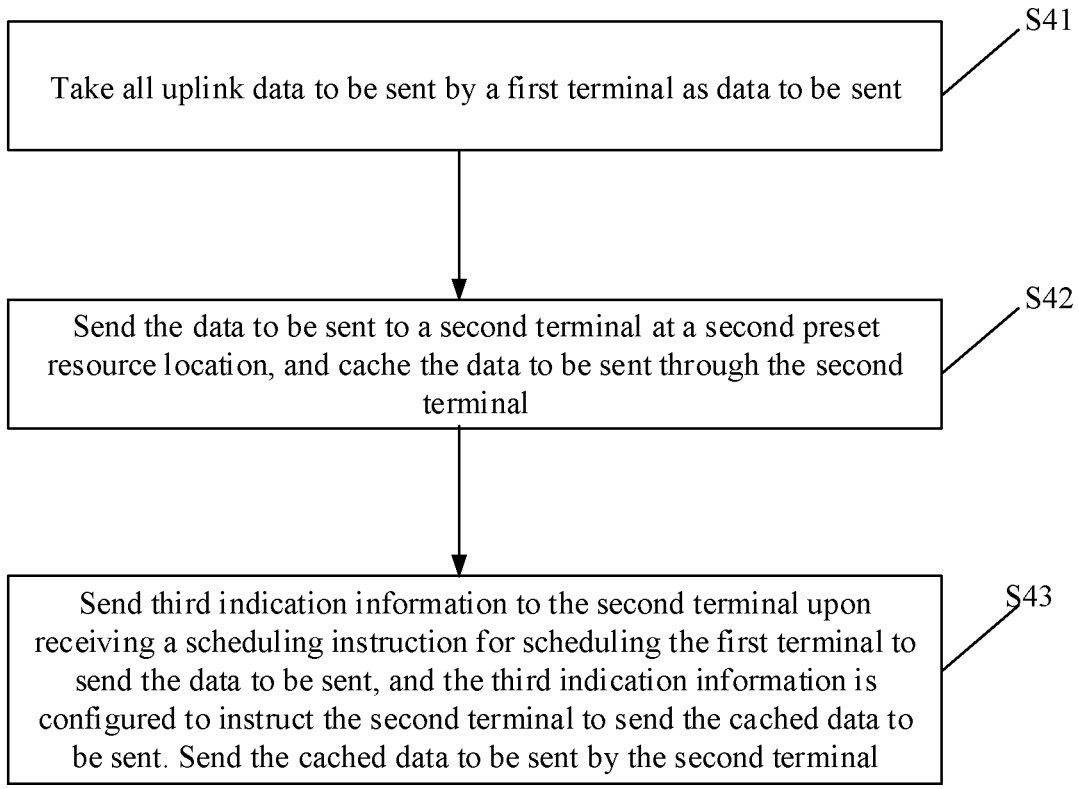
FIG. 7 is a flow diagram of yet another coverage enhancement method shown according to an example.

FIG. 7 is a flow diagram of a coverage enhancement method shown according to an example of the disclosure. Referring to FIG. 7, the coverage enhancement method is applied to the first terminal, and includes the following step S41 to step S43.

In step S41, all uplink data to be sent by the first terminal are taken as data to be sent.

In step S42, the data to be sent are sent to the second terminal at a second preset resource location, and the data to be sent are cached through the second terminal.

In step S43, third indication information is sent to the second terminal upon receiving a scheduling instruction for scheduling the first terminal to send the data to be sent, and the third indication information is configured to instruct the second terminal to send the cached data to be sent. The second terminal sends the cached data to be sent.

It may be understood that, communication between the first terminal and the second terminal in the example of the disclosure may be implemented based on technologies such as Bluetooth and D2D/V2X.

In the example of the disclosure, in order to identify that the data sent by the second terminal are data sent in cooperation with the first terminal, when assisting the first terminal in sending the data, the second terminal may add an identity to data sent by assisting the first terminal, that is, the data to be sent by the second terminal include identification information, and the identification information is configured to identify the data to be sent as data sent by the second terminal in cooperation with the first terminal. The identification information includes but not limited to a cooperative sending identity configured to represent cooperative sending of the data through the second terminal, a first terminal identity, or a data identity configured to represent that the data are data cooperatively sent. After receiving the data sent by the first terminal and the second terminal, the network device may perform merging processing on the received data according to the identification information.

In the example of the disclosure, in a scenario where coverage of the first terminal is limited, the data to be sent determined by the first terminal are sent through the second terminal, so as to realize cooperation between the terminals and improve uplink coverage performance.

Figure 8:
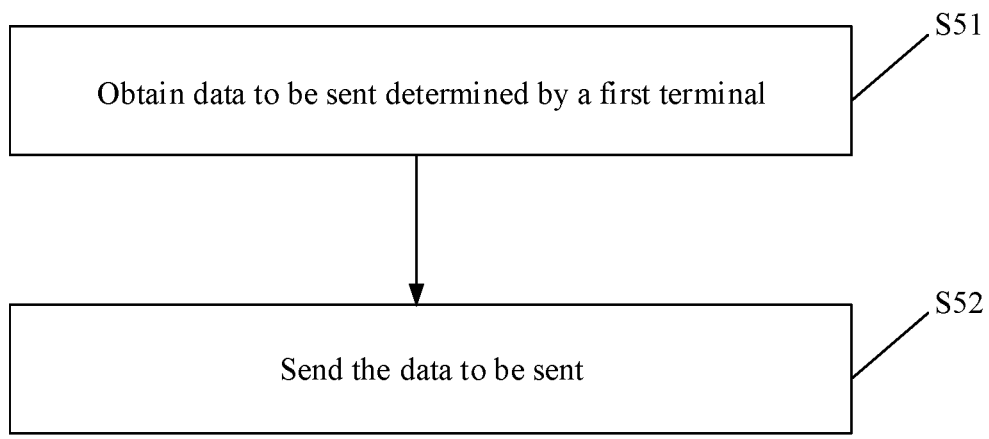
FIG. 8 is a flow diagram of yet another coverage enhancement method shown according to an example.

FIG. 8 is a flow diagram of a coverage enhancement method shown according to an example of the disclosure. Referring to FIG. 8, the coverage enhancement method is applied to the second terminal, and includes the following step S51 to step S52.

In step S51, data to be sent determined by the first terminal are obtained.

In step S52, the data to be sent are sent.

The data to be sent are all or part of the uplink data scheduled by a first scheduling instruction. The first scheduling instruction is configured to schedule the first terminal to send the uplink data.

In an implementation of the example of the disclosure, the first scheduling instruction further includes time-frequency resource location information for sending the data to be sent by the second terminal. When assisting the first terminal in sending the data to be sent, the second terminal may send the data to be sent based on the time-frequency resource location information included in the first scheduling instruction.

Figure 9:
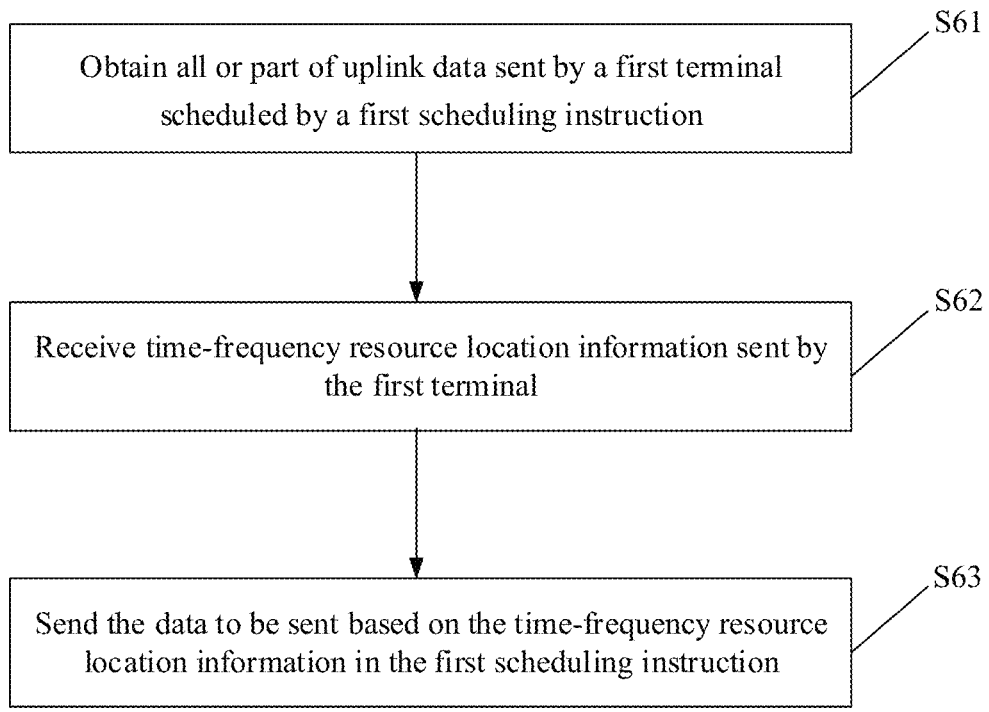
FIG. 9 is a flow diagram of yet another coverage enhancement method shown according to an example.

FIG. 9 is a flow diagram of a coverage enhancement method shown according to an example of the disclosure. Referring to FIG. 9, the coverage enhancement method is applied to the second terminal, and includes the following step S61 to step S63.

In step S61, all or part of uplink data sent by the first terminal scheduled by a first scheduling instruction are obtained.

The first scheduling instruction further includes time-frequency resource location information for sending data to be sent by the second terminal.

In step S62, the time-frequency resource location information sent by the first terminal are received.

In step S63, the data to be sent are sent based on the time-frequency resource location information in the first scheduling instruction.

Figure 10:
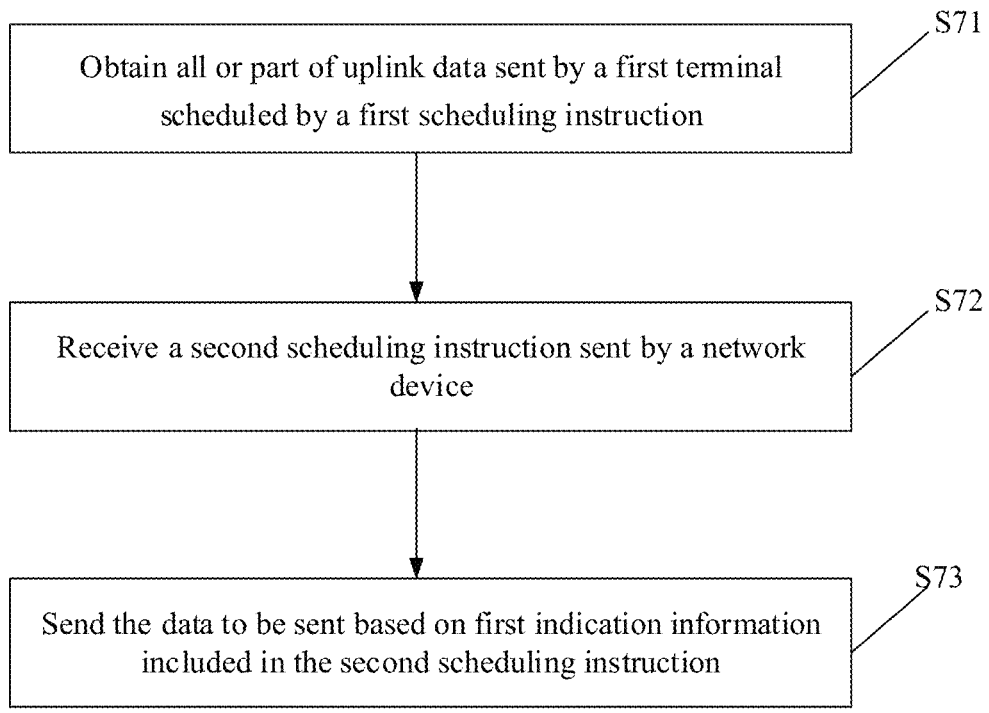
FIG. 10 is a flow diagram of yet another coverage enhancement method shown according to an example.

FIG. 10 is a flow diagram of a coverage enhancement method shown according to an example of the disclosure. Referring to FIG. 10, the coverage enhancement method is applied to the second terminal, and includes the following step S71 to step S73.

In step S71, all or part of uplink data sent by a first terminal scheduled by a first scheduling instruction are obtained.

In step S72, a second scheduling instruction sent by a network device is received.

The second scheduling instruction is sent by the network device to the first terminal and the second terminal, and includes first indication information for instructing the second terminal to assist the first terminal in sending data to be sent.

In step S73, the data to be sent are sent based on the first indication information included in the second scheduling instruction.

In the example of the disclosure, both the first terminal and the second terminal receive the second scheduling instruction sent by the network device. The second scheduling instruction includes the first indication information for instructing the second terminal to assist the first terminal in sending the data to be sent. The first terminal sends the data to be sent to the second terminal. The second terminal assists the first terminal in sending the data to be sent based on the first indication information.

In the example of the disclosure, the data sent by the second terminal in cooperation with the first terminal may be all uplink data to be sent by the first terminal.

Figure 11:
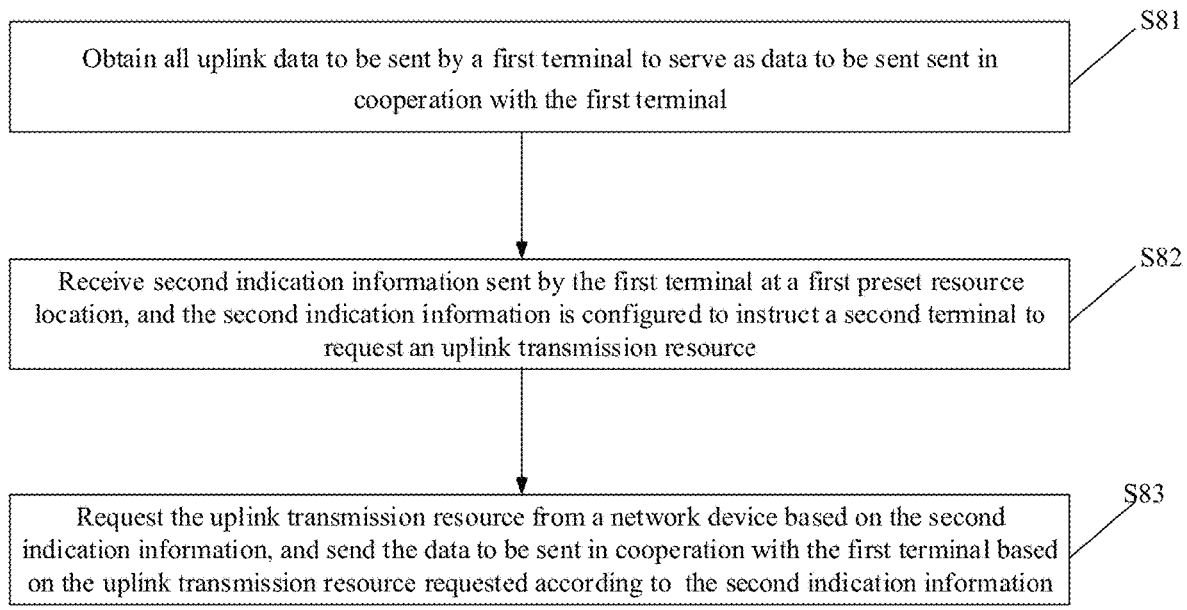
FIG. 11 is a flow diagram of yet another coverage enhancement method shown according to an example.

FIG. 11 is a flow diagram of a coverage enhancement method shown according to an example of the disclosure. Referring to FIG. 11, the coverage enhancement method is applied to the second terminal, and includes the following step S81 to step S83.

In step S81, all uplink data to be sent by the first terminal are obtained to serve as data to be sent in cooperation with the first terminal.

In step S82, second indication information sent by the first terminal at a first preset resource location is received, and the second indication information is configured to instruct the second terminal to request an uplink transmission resource.

In step S83, the uplink transmission resource is requested from a network device based on the second indication information, and the data to be sent are sent in cooperation with the first terminal based on the uplink transmission resource requested according to the second indication information.

Figure 12:
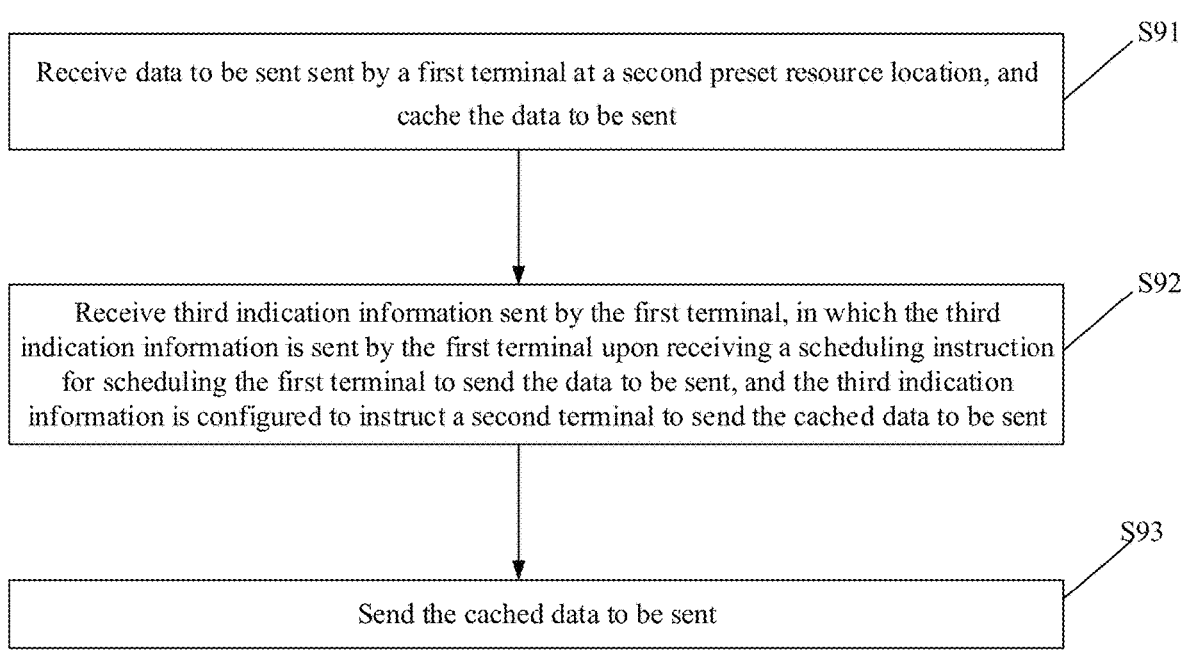
FIG. 12 is a flow diagram of yet another coverage enhancement method shown according to an example.

FIG. 12 is a flow diagram of a coverage enhancement method shown according to an example of the disclosure. Referring to FIG. 12, the coverage enhancement method is applied to the second terminal, and includes the following step S91 to step S93.

In step S91, data to be sent by the first terminal at a second preset resource location are received, and the data to be sent are cached.

The data to be sent by the first terminal at the second preset resource location are all uplink data to be sent by the first terminal.

In step S92, third indication information sent by the first terminal is received. The third indication information is sent by the first terminal upon receiving a scheduling instruction for scheduling the first terminal to send the data to be sent. The third indication information is configured to instruct the second terminal to send the cached data to be sent.

In step S93, the cached data to be sent are sent.

It may be understood that, communication between the first terminal and the second terminal in the example of the disclosure may be implemented based on technologies such as Bluetooth and D2D/V2X.

In the example of the disclosure, in order to identify that the data sent by the second terminal are data sent in cooperation with the first terminal, when assisting the first terminal in sending the data, the second terminal may add an identity to data sent by assisting the first terminal, that is, the data to be sent by the second terminal include identification information, and the identification information is configured to identify the data to be sent as data sent by the second terminal in cooperation with the first terminal. The identification information includes but not limited to a cooperative sending identity configured to represent cooperative sending of the data through the second terminal, a first terminal identity, or a data identity configured to represent that the data are data cooperatively sent. After receiving the data sent by the first terminal and the second terminal, the network device may perform merging processing on the received data according to the identification information.

In the example of the disclosure, in a scenario where uplink coverage is limited, cooperation between the terminals can improve uplink coverage performance, and can be effectively applied in a communication scenario where terminals with different capabilities exist in a network to improve the uplink coverage performance of some low-capability terminals.

The example of the disclosure further provides a downlink coverage enhancement method. In the downlink coverage enhancement method, downlink coverage can be improved by a method of coordination between terminals or between network devices. In the example of the disclosure, a device assisting the first terminal in data transmission may be called an assisting device, and the assisting device is the device assisting the first terminal in data transmission, which may be the terminal or the network device.

For convenience of description in the example of the disclosure, the terminal with the limited coverage and needing to be assisted is called a first terminal. A terminal assisting the first terminal in downlink transmission is called a second terminal. A network device that originally sends downlink information to the first terminal is called a first network device. A network device assisting the first terminal in downlink transmission is called a second network device. Further, in the example of the disclosure, information transmitted by the assisting device in assisting the first terminal for downlink transmission is called first information, and information sent by the first network device is called second information.

Figure 13:
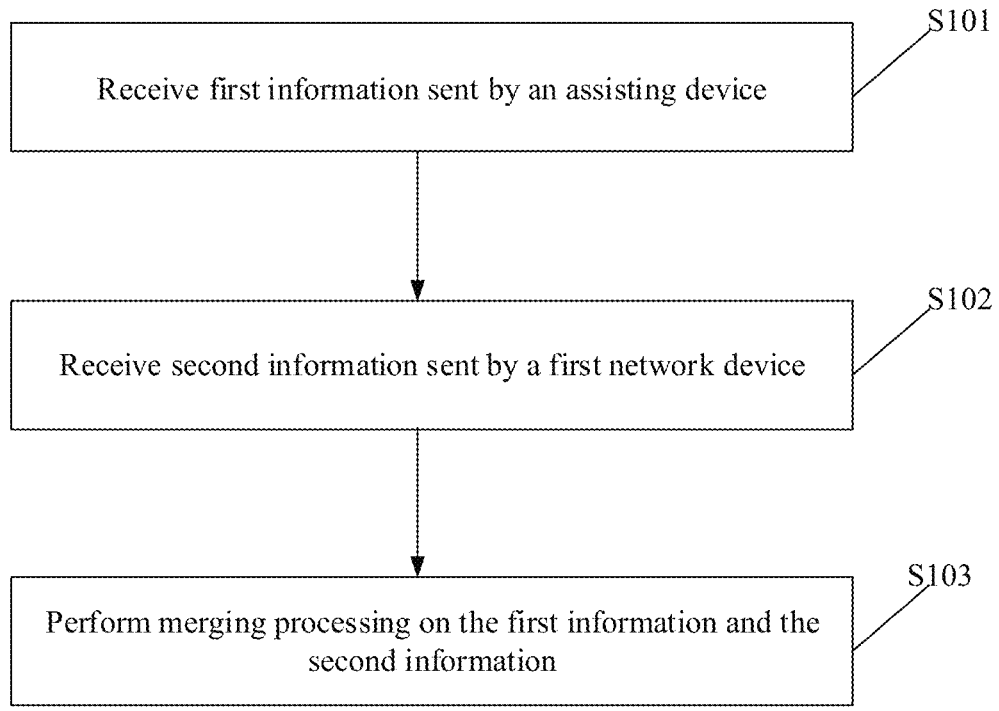
FIG. 13 is a flow diagram of yet another coverage enhancement method shown according to an example.

FIG. 13 is a flow diagram of a coverage enhancement method shown according to an example of the disclosure. Referring to FIG. 13, the coverage enhancement method is applied to the first terminal, and includes the following step S101 to step S103.

In step S101, first information sent by an assisting device is received.

The assisting device is a device assisting the first terminal in data transmission.

In step S102, second information sent by the first network device is received.

In step S103, merging processing is performed on the first information and the second information.

In the example of the disclosure, the assisting device may be a second terminal different from the first terminal, or may be a second network device different from the first network device.

When the assisting device is the second terminal different from the first terminal, the first information is received by the second terminal from the first network device and forwarded to the first terminal. There may be one or more second terminals. That is, the plurality of terminals may cooperate to receive downlink data sent by the network device. Enhancement of downlink coverage is achieved through cooperation between the terminals. Communication between the first terminal and the second terminal may be implemented based on technologies such as Bluetooth and D2D/V2X.

In the example of the disclosure, the first information and the second information may be the same, or may also be different parts split from the same information.

The first information and the second information may be downlink control information or downlink data.

In an implementation, the first information and the second information may be the same downlink control information. When the first network device sends downlink control information for the first terminal, identification information of the first terminal may be added to the downlink control information. Both the first terminal and the second terminal may receive the downlink control information of the first terminal. After receiving the downlink control information (the first information) of the first terminal, the second terminal forwards the received downlink control information (the first information) of the first terminal to the first terminal. The first terminal performs merging processing on received downlink control information (the second information) of the first terminal sent by the first network device and the downlink control information (the first information) of the first terminal forwarded by the second terminal.

In the example of the disclosure, when the first information and the second information are the same downlink control information, a public radio network temporary identity (RNTI) in a group may be defined, and both the first terminal and the second terminal may listen control information of the corresponding multicast scheduling at an indicated location based on high-level signaling configuration. That is, the first terminal and the second terminal listen the downlink control information of multicast scheduling at a designated location based on the same multicast scheduling radio network temporary identity.

In the example of the disclosure, when the first network device sends the downlink control information for the first terminal, the identification information of the first terminal is added to the downlink control information of the first terminal. The second terminal may receive the downlink control information (the first information) of the first terminal. After receiving the downlink control information (the first information) of the first terminal and when parsing to obtain that the downlink control information (the first information) of the first terminal includes the identification information of the first terminal, the second terminal determines that the downlink control information is for the first terminal, and forwards the downlink control information (the first information) of the first terminal to the first terminal.

In an implementation, the first information and the second information are different parts split from the same information. For example, the first information and the second information are different data split from the same downlink data. The first information and the second information contain identification information for identifying the same downlink data. That is, when the first network device sends the downlink data for the first terminal, the first network device may split a downlink data packet, send a part of the split downlink data packet (the first information) to the second terminal, and send another part of the downlink data packet (the second information) to the first terminal. In view of limited coverage of the first terminal, a data packet size of the first information may be larger than a data packet size of the second information. The first information and the second information contain identification information for identifying the split downlink data packet, for example, indication information is added to the scheduling instruction to indicate that the data are for the split downlink data packet. After receiving the data packet (the first information), the second terminal forwards it to the first terminal. The data packet (the first information) received by the second terminal includes the identification information, and the identification information needs to indicate information of the split downlink data packet. The first terminal performs merging processing on the received data packet (the second information) sent by the first network device and the data packet (the first information) sent by the second terminal to obtain the split downlink data packet.

In the example of the disclosure, the downlink coverage of the terminals is enhanced through coordination between the terminals.

Figure 14:
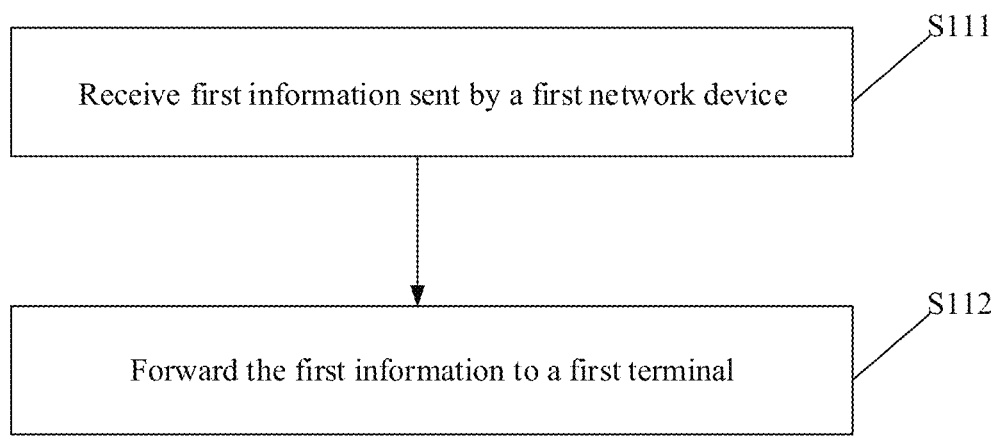
FIG. 14 is a flow diagram of yet another coverage enhancement method shown according to an example.

FIG. 14 is a flow diagram of a coverage enhancement method shown according to an example of the disclosure. Referring to FIG. 14, the coverage enhancement method is applied to the second terminal, and includes the following step S111 to step S112.

In step S111, first information sent by a first network device is received.

In step S112, the first information is forwarded to the first terminal.

The first information and second information may be the same. For example, the first information and the second information may be downlink control information.

When the first information and the second information are the same downlink control information, the first terminal and the second terminal listen the downlink control information of multicast scheduling at a designated location based on the same multicast scheduling radio network temporary identity.

The downlink control information includes identification information of the first terminal. The second terminal may receive the downlink control information (the first information) of the first terminal. After receiving the downlink control information (the first information) of the first terminal and when parsing to obtain that the downlink control information (the first information) of the first terminal includes the identification information of the first terminal, the second terminal determines that the downlink control information is for the first terminal and forwards the downlink control information (the first information) of the first terminal to the first terminal.

The first information and the second information may also be different parts split from the same information. For example, the first information and the second information are different data split from the same downlink data. The first information and the second information contain identification information for identifying the downlink data.

When the first network device sends the downlink data for the first terminal, the first network device may split a downlink data packet, send a part of the split downlink data packet (the first information) to the second terminal, and send another part of the downlink data packet (the second information) to the first terminal. In view of limited coverage of the first terminal, a data packet size of the first information may be larger than a data packet size of the second information. The first information and the second information contain identification information for identifying the split downlink data packet, for example, indication information is added to the scheduling instruction to indicate that the data are for the split downlink data packet. After receiving the data packet (the first information), the second terminal forwards it to the first terminal. The data packet (the first information) received by the second terminal includes the identification information, and the identification information needs to indicate information of the split downlink data packet. The first terminal performs merging processing on the received data packet (the second information) sent by the first network device and the data packet (the first information) sent by the second terminal to obtain the split downlink data packet.

When an assisting device in the example of the disclosure is a second network device different from the first network device, downlink coverage of the first terminal may be enhanced through assistance between the network devices. For example, the network device identifies the first terminal with limited coverage, and notifies the first terminal of virtual cell identification information through a high-layer signaling. The downlink data for the first terminal are all scrambled by a virtual cell identity. The first network device and the second network device send downlink control information or downlink data to the terminal through the virtual cell identity by means of coordination between the network devices. The second network device may be a neighbor network device of the first terminal. After receiving the second information sent by the first network device and the first information sent by the second network device, the first terminal may descramble the first information and the second information based on the same virtual cell identity.

Figure 15:
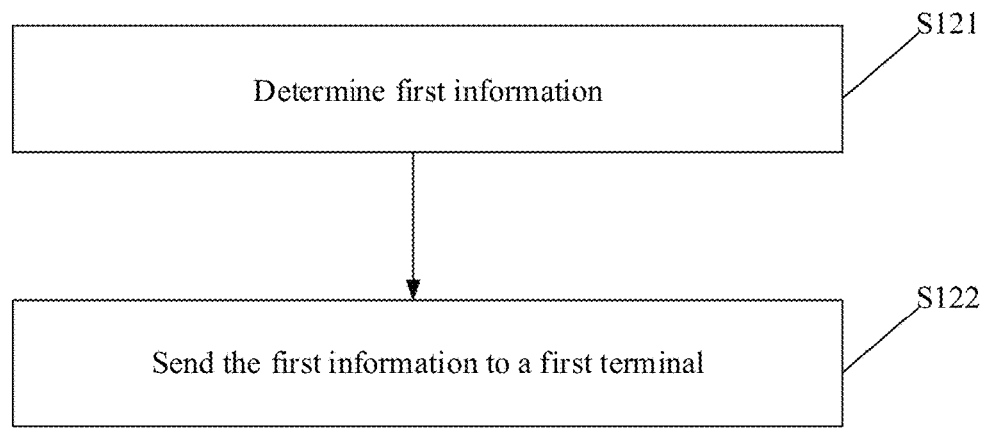
FIG. 15 is a flow diagram of yet another coverage enhancement method shown according to an example.

FIG. 15 is a flow diagram of a coverage enhancement method shown according to an example of the disclosure. Referring to FIG. 15, the coverage enhancement method is applied to the second network device, and includes the following step S121 to step S122.

In step S121, first information is determined.

The first information and second information are scrambled based on the same virtual cell identity. The second information is sent by a first network device to the first terminal.

In step S122, the first information is sent to the first terminal.

When an assisting device in the example of the disclosure is the second network device different from the first network device, downlink coverage of the first terminal may be enhanced through assistance between the network devices.

It may be understood that the coverage enhancement method provided by the example of the disclosure may be applicable to an interaction process between the network devices and the terminal. An operation execution process of the terminal and the network devices involved in the interaction process may refer to the relevant description of the above example, which is not repeated here.

In the example of the disclosure, in a scenario where downlink coverage is limited, cooperation between the terminals or cooperation between the network devices can improve downlink coverage performance, and can be effectively applied in a communication scenario where terminals with different capabilities exist in a network to improve the downlink coverage performance of some low-capability terminals.

Based on the same concept, an example of the disclosure further provides a coverage enhancement apparatus.

It may be understood that, in order to implement the above functions, the coverage enhancement apparatus provided by the example of the disclosure includes corresponding hardware structures and/or software modules for executing all the functions. Combining with units and algorithm steps of each example disclosed in the example of the disclosure, the example of the disclosure can be implemented in a form of hardware or a combination of hardware and computer software. Whether a function is executed in a mode of hardware or a mode of the hardware driven by the computer software depends on a specific application and design constraint conditions of the technical solution. Those skilled in the art may use different methods to implement the described functions for each specific application, but such implementation should not be considered beyond the scope of the technical solution of the example of the disclosure.

Figure 16:
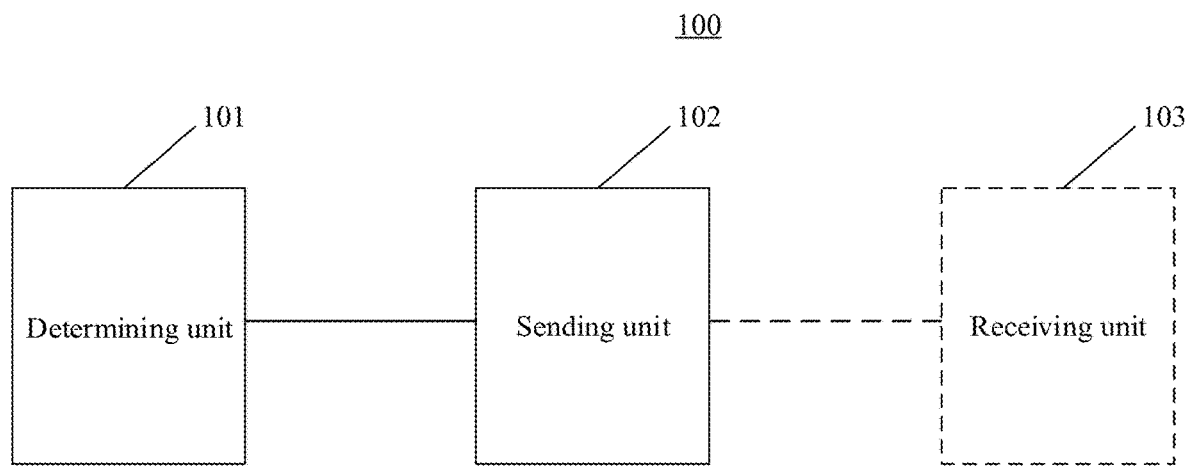
FIG. 16 is a block diagram of a coverage enhancement apparatus shown according to an example.

FIG. 16 is a coverage enhancement apparatus shown according to an example of the disclosure. Referring to FIG. 16, the coverage enhancement apparatus 100 is applied to the first terminal and includes a determining unit 101 and a sending unit 102.

The determining unit 101 is configured to determine data to be sent. The sending unit 102 is configured to send the data to be sent through a second terminal.

In an implementation, the coverage enhancement apparatus 100 further includes a receiving unit 103.

The receiving unit 103 is configured to receive a first scheduling instruction sent by a network device, in which the first scheduling instruction is configured to schedule the first terminal to send uplink data; and the data to be sent are all or part of the uplink data scheduled by the first scheduling instruction.

In an implementation, the first scheduling instruction further includes time-frequency resource location information for sending the data to be sent by the second terminal.

The sending unit 102 is configured to send the data to be sent through the second terminal by employing the following modes:

sending the data to be sent and the time-frequency resource location information to the second terminal, and sending, through the second terminal, the data to be sent based on the time-frequency resource location information.

In an implementation, the sending unit 102 is configured to send the data to be sent through the second terminal by employing the following modes:

sending the data to be sent to the second terminal, and sending, through the second terminal, the data to be sent based on a second scheduling instruction.

The second scheduling instruction is sent by the network device to the first terminal and the second terminal, and includes first indication information for instructing the second terminal to assist the first terminal in sending the data to be sent.

In an implementation, the data to be sent are uplink data to be sent by the first terminal.

The sending unit 102 is configured to send the data to be sent through the second terminal by employing the following modes:

sending second indication information to the second terminal at a first preset resource location, in which the second indication information is configured to instruct the second terminal to request an uplink transmission resource. The data to be sent are sent to the second terminal, and the second terminal sends the data to be sent based on the uplink transmission resource requested according to the second indication information.

In an implementation, the sending unit 102 is configured to send the data to be sent through the second terminal by employing the following modes:

sending the data to be sent to the second terminal at a second preset resource location, and caching the data to be sent through the second terminal.

The coverage enhancement apparatus 100 further includes a receiving unit 103.

The receiving unit 103 is configured to receive a scheduling instruction for scheduling the first terminal to send the data to be sent. When the receiving unit 103 receives the scheduling instruction for scheduling the first terminal to send the data to be sent, the sending unit 102 is configured to send third indication information to the second terminal, and the third indication information is configured to instruct the second terminal to send the cached data to be sent.

In an implementation, the data to be sent by the second terminal contain identification information, and the identification information is configured to identify the data to be sent as data sent by the second terminal in cooperation with the first terminal.

The identification information includes a cooperative sending identity configured to represent cooperative sending of the data through the second terminal, a first terminal identity, or a data identity configured to represent that the data are data cooperatively sent.

Figure 17:
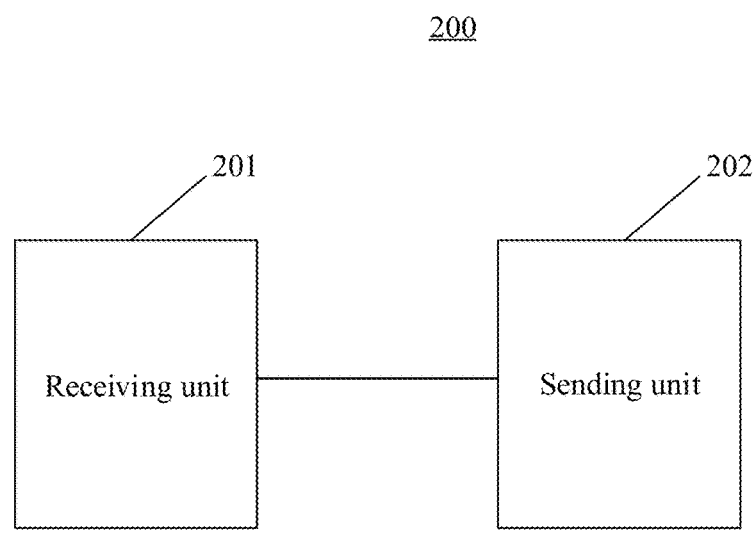
FIG. 17 is a block diagram of another coverage enhancement apparatus shown according to an example.

FIG. 17 is a coverage enhancement apparatus shown according to an example of the disclosure. Referring to FIG. 17, the coverage enhancement apparatus 200 is applied to the second terminal and includes a receiving unit 201 and a sending unit 202.

The receiving unit 201 is configured to obtain data to be sent determined by a first terminal. The sending unit 202 is configured to send the data to be sent.

In an implementation, the data to be sent are all or part of uplink data scheduled by a first scheduling instruction, and the first scheduling instruction is configured to schedule the first terminal to send the uplink data.

In an implementation, the first scheduling instruction further includes time-frequency resource location information for sending the data to be sent by the second terminal.

The receiving unit 201 is configured to receive the time-frequency resource location information send by the first terminal, and the sending unit 202 is configured to send the data to be sent based on the time-frequency resource location information.

In an implementation, the receiving unit 201 is further configured to receive a second scheduling instruction sent by a network device, in which the second scheduling instruction is sent by the network device to the first terminal and the second terminal, and includes first indication information for instructing the second terminal to assist the first terminal in sending the data to be sent.

The sending unit 202 is configured to send the data to be sent based on the first indication information included in the second scheduling instruction.

In an implementation, the data to be sent are uplink data to be sent by the first terminal.

In an implementation, the receiving unit 201 is configured to receive second indication information sent by the first terminal at a first preset resource location, and the second indication information is configured to instruct the second terminal to request an uplink transmission resource. The sending unit 202 is configured to request the uplink transmission resource from a network device based on the second indication information, and send the data to be sent based on the uplink transmission resource requested according to the second indication information.

In an implementation, the receiving unit 201 is configured to receive the data to be sent by the first terminal at a second preset resource location, cache the data to be sent, and receive third indication information sent by the first terminal, in which the third indication information is sent by the first terminal upon receiving a scheduling instruction for scheduling the first terminal to send the data to be sent, and the third indication information is configured to instruct the second terminal to send the cached data to be sent. The sending unit 202 is configured to send the cached data to be sent.

In an implementation, the data to be sent by the second terminal contain identification information, and the identification information is configured to identify the data to be sent as data sent by the second terminal in cooperation with the first terminal.

The identification information includes a cooperative sending identity configured to represent cooperative sending of the data through the second terminal, a first terminal identity, or a data identity configured to represent that the data are data cooperatively sent.

Figure 18:
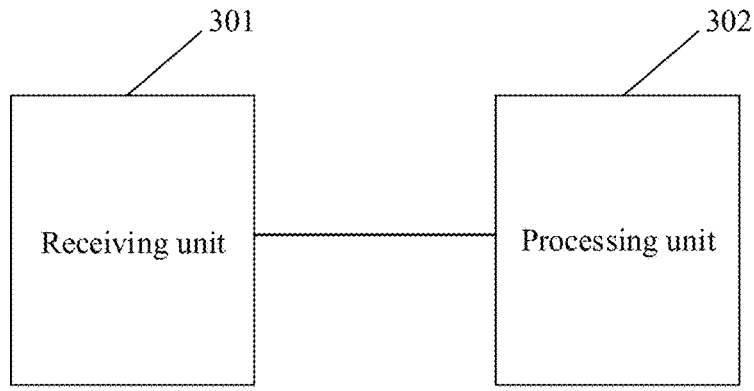
FIG. 18 is a block diagram of yet another coverage enhancement apparatus shown according to an example.

FIG. 18 is a coverage enhancement apparatus shown according to an example of the disclosure. Referring to FIG. 18, the coverage enhancement apparatus 300 is applied to the first terminal, and includes a receiving unit 301 and a processing unit 302.

The receiving unit 301 is configured to receive first information sent by an assisting device and receive second information sent by a first network device. The assisting device is a device assisting the first terminal in data transmission. The processing unit 302 is configured to perform merging processing on the first information and the second information.

In an implementation, the assisting device is a second terminal different from the first terminal.

In an implementation, the first information is received and forwarded by the second terminal from the first network device, and is the same as the second information.

In an implementation, the first information and the second information are downlink control information.

The first terminal and the second terminal listen the downlink control information of multicast scheduling at a designated location based on the same multicast scheduling radio network temporary identity.

In an implementation, the downlink control information includes identification information of the first terminal.

In an implementation, the first information is received and forwarded by the second terminal from the first network device, and the first information and the second information are different parts split from the same information.

In an implementation, the first information and the second information are different data split from the same downlink data.

The first information and the second information contain identification information for identifying the downlink data.

In an implementation, the assisting device is a second network device different from the first network device.

In an implementation, the first information and the second information are scrambled based on the same virtual cell identity.

Figure 19:
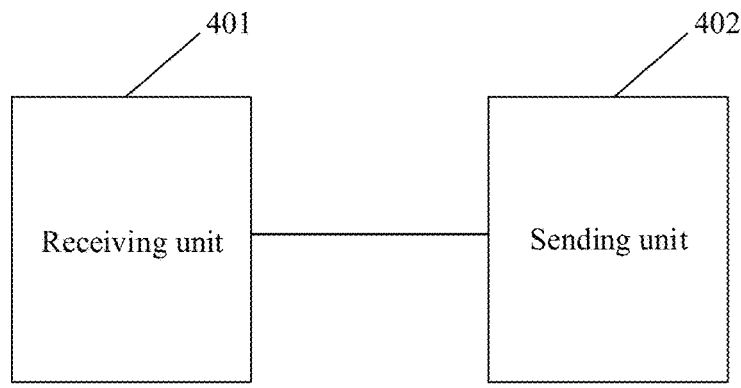
FIG. 19 is a block diagram of yet another coverage enhancement apparatus shown according to an example.

FIG. 19 is a coverage enhancement apparatus shown according to an example of the disclosure. Referring to FIG. 19, the coverage enhancement apparatus 400 is applied to the second terminal, and includes a receiving unit 401 and a sending unit 402.

The receiving unit 401 is configured to receive first information sent by a first network device. The sending unit 402 is configured to forward the first information to a first terminal.

In an implementation, the first information and second information are the same, and the second information is sent by the first network device to the first terminal.

In an implementation, the first information and the second information are downlink control information.

The first terminal and the second terminal listen the downlink control information of multicast scheduling at a designated location based on the same multicast scheduling radio network temporary identity.

In an implementation, the downlink control information includes identification information of the first terminal.

In an implementation, the first information and the second information are different parts split from the same information.

In an implementation, the first information and the second information are different data split from the same downlink data.

The first information and the second information contain identification information for identifying the downlink data.

Figure 20:
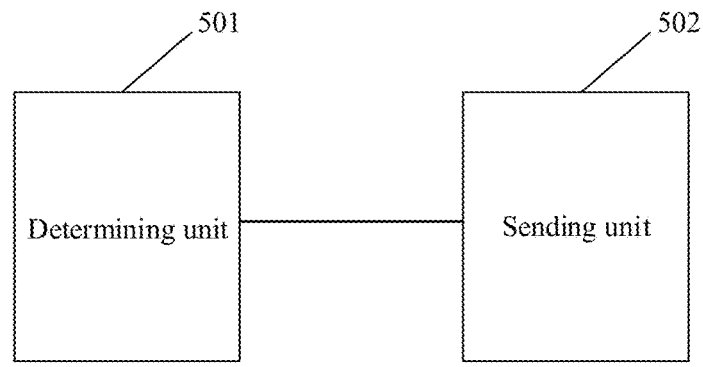
FIG. 20 is a block diagram of yet another coverage enhancement apparatus shown according to an example.

FIG. 20 is a coverage enhancement apparatus shown according to an example of the disclosure. Referring to FIG. 20, the coverage enhancement apparatus 500 is applied to the second network device, and includes a determining unit 501 and a sending unit 502.

The determining unit 501 is configured to determine first information, and the first information and second information are scrambled based on the same virtual cell identity, and the second information is sent by a first network device to a first terminal. The sending unit 502 is configured to send the first information to the first terminal.

As for the apparatus in the above examples, the specific modes for executing operations by all modules have be described in the examples related to the method in detail, which is not illustrated in detail here.

Figure 21:
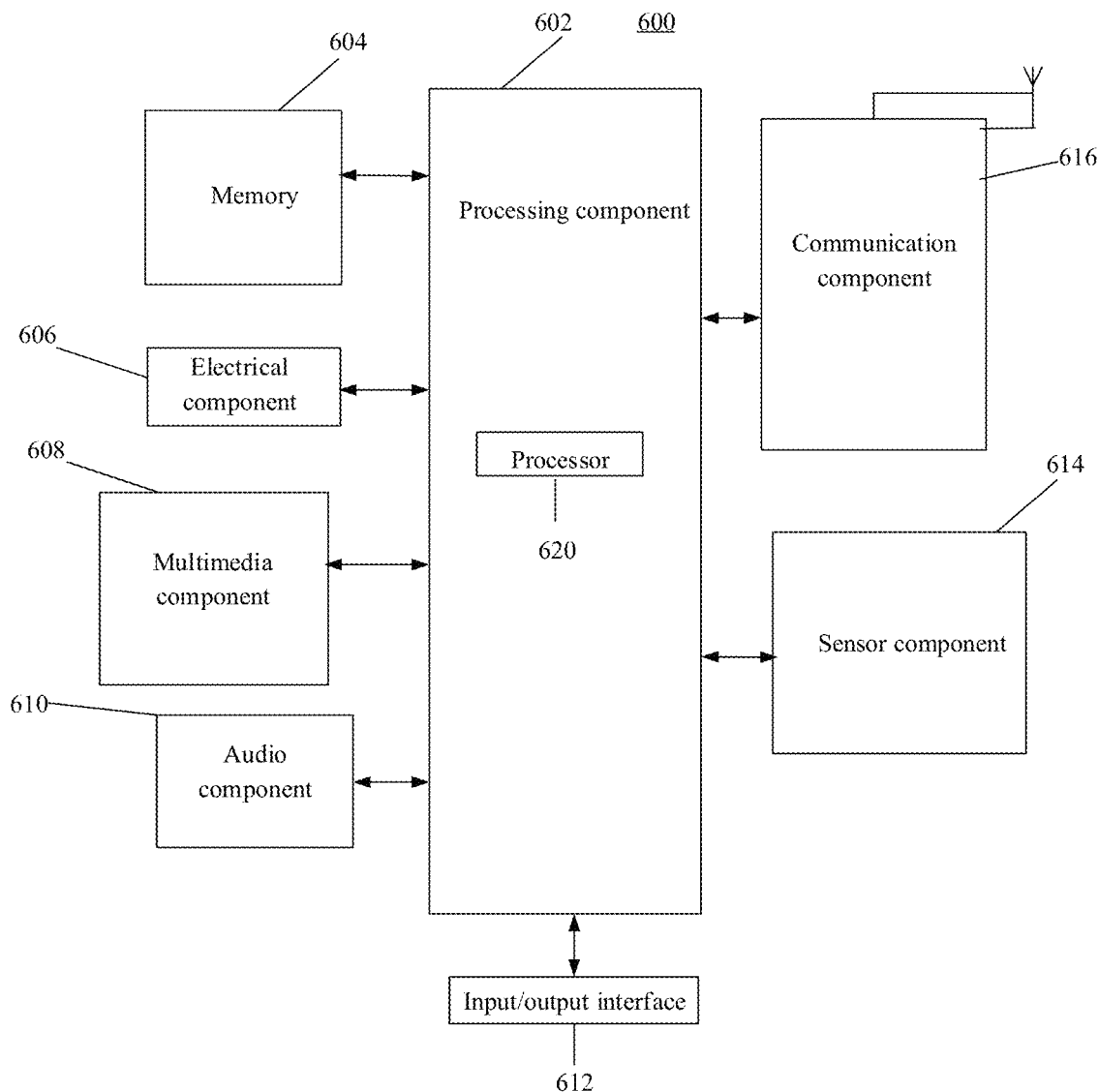
FIG. 21 is a schematic diagram of an apparatus for coverage enhancement shown according to an example.

FIG. 21 is a block diagram of an apparatus 600 for coverage enhancement shown according to an example. The apparatus 600 may be the first terminal or the second terminal. The first terminal and the second terminal may be a mobile telephone, a computer, a digital broadcast terminal, a message transceiving device, a game console, a tablet device, a medical device, a fitness device, a personal digital assistant, and the like.

Referring to FIG. 21, the apparatus 600 may include one or more of the following components: a processing component 602, a memory 604, an electrical component 606, a multimedia component 608, an audio component 610, an input/output (I/O) interface 612, a sensor component 614, and a communication component 616.

The processing component 602 usually controls overall operation of the apparatus 600, such as operations associated with displaying, telephone calling, data communication, a camera operation and a record operation. The processing component 602 may include one or more processors 620 to execute an instruction, so as to complete all or part of steps of the above method. In addition, the processing component 602 may include one or more modules, so as to facilitate interaction between the processing component 602 and other components. For example, the processing component 602 may include a multimedia module, so as to facilitate interaction between the multimedia component 608 and the processing component 602.

The memory 604 is configured to store various types of data so as to support operations on the apparatus 600. Examples of these data include instructions of any application program or method configured to be operated on the apparatus 600, contact data, telephone directory data, messages, pictures, videos, and the like. The memory 604 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 606 provides electric power for various components of the apparatus 600. The electrical component 606 may include a power management system, one or more power sources, and other components associated with generating, managing and distributing electric power for the apparatus 600.

The multimedia component 608 includes a screen providing an output interface between the apparatus 600 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping and gestures on the touch panel. The touch sensor may not only sense a boundary of a touching or swiping action, but also detect duration and pressure related to the touching or swiping operation. In some examples, the multimedia component 608 includes a front camera and/or a back camera. When the apparatus 600 is in an operation mode, such as a shooting mode or a video mode, the front camera and/or the back camera may receive external multimedia data. Each of the front camera and the back camera may be a fixed optical lens system or have a focal length and optical zooming capability.

The audio component 610 is configured to output and/or input an audio signal. For example, the audio component 610 includes a microphone (MIC). When the apparatus 600 is in the operation mode, such as a call mode, a recording mode or a speech recognition mode, the microphone is configured to receive an external audio signal. The received audio signal may be further stored in the memory 604 or sent via the communication component 616. In some examples, the audio component 610 further includes a speaker for outputting an audio signal.

The I/O interface 612 provides an interface between the processing component 602 and a peripheral interface module, and the above peripheral interface module may be a keyboard, a click wheel, buttons, etc. These buttons may include but are not limited to: a home button, a volume button, a start button and a lock button.

The sensor component 614 includes one or more sensors for providing state evaluations of all aspects for the apparatus 600. For example, the sensor component 614 may detect an on/off state of the apparatus 600 and relative positioning of components, for example, the components are a display and a keypad of the apparatus 600. The sensor component 614 may further detect position change of the apparatus 600 or one component of the apparatus 600, whether there is contact between the user and the apparatus 600, azimuth or speed up/speed down of the apparatus 600, and temperature change of the apparatus 600. The sensor component 614 may include a proximity sensor, and is configured to detect existence of a nearby object without any physical contact. The sensor component 614 may further include an optical sensor, such as a CMOS or CCD image sensor, for use in imaging application. In some examples, the sensor component 614 may further include an acceleration sensor, a gyroscope sensor, a magnetic sensor, a pressure sensor or a temperature sensor.

The communication component 616 is configured to facilitate wired or wireless communication between the apparatus 600 and other devices. The apparatus 600 may access a wireless network based on a communication standard, such as WiFi, 2G or 6G, or their combination. In an example, the communication component 616 receives a broadcast signal or broadcast related information from an external broadcast management system via a broadcast channel. In an example, the communication component 616 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In the example, the apparatus 600 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method.

In the example, a non-temporary computer readable storage medium including an instruction is further provided, such as the memory 604 including instructions. The above instruction may be executed by the processor 620 of the apparatus 600 so as to complete the above method. For example, the non-temporary computer readable storage medium may be an ROM, a random access memory (RAM), a CD-ROM, a magnetic tape, a floppy disk, an optical data storage device and the like.

Figure 22:
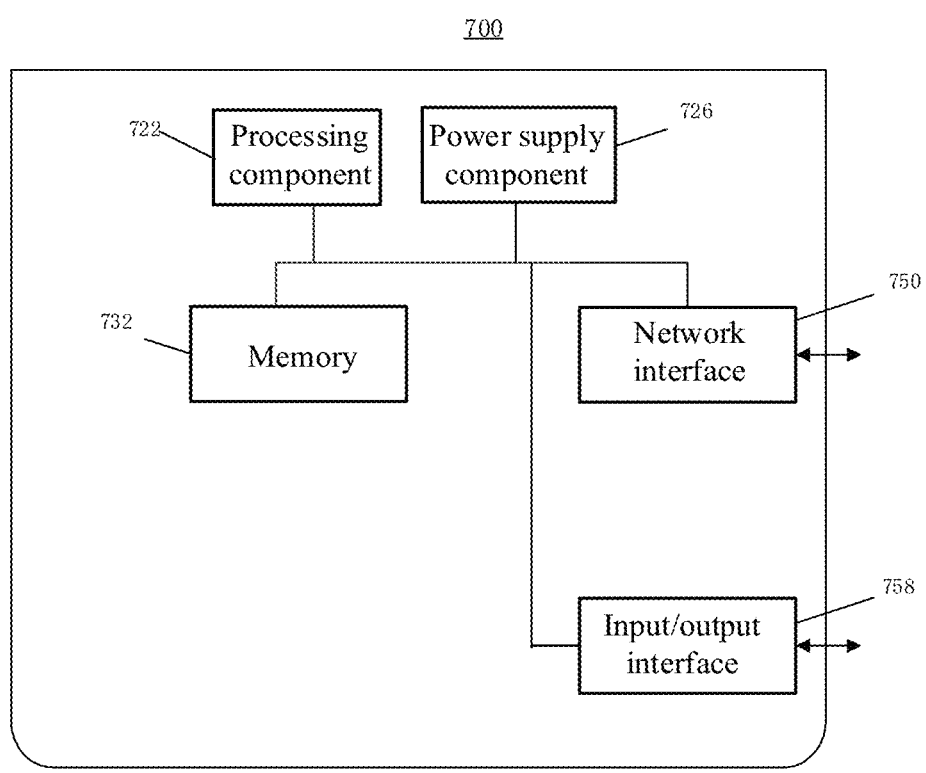
FIG. 22 is a schematic diagram of another apparatus for coverage enhancement shown according to an example.

FIG. 22 is a block diagram of an apparatus 700 for coverage enhancement shown according to an example. The apparatus 700 may be the network device. Referring to FIG. 22, the apparatus 700 includes a processing component 722, which further includes one or more processors, and a memory resource represented by a memory 732, for storing instructions executable by the processing component 722, such as an application program. The application program stored in the memory 732 may include one or more modules with each corresponding to a set of instructions. In addition, the processing component 722 is configured to execute the instructions to execute the above method.

The apparatus 700 may further include a power supply component 726 configured to execute power management of the apparatus 700, a wired or wireless network interface 750 configured to connect the apparatus 700 to a network, and an input/output (I/O) interface 758. The apparatus 700 may operate based on an operating system stored in a memory 732, such as Windows Server™, Mac OS X™, Unix™, Linux™, FreeBSD™ or the like.

In the example, a non-temporary computer readable storage medium including an instruction is further provided, such as the memory 732 including instructions. The above instruction may be executed by a processor of the apparatus 700 so as to complete the above method. For example, the non-temporary computer readable storage medium may be an ROM, a random access memory (RAM), a CD-ROM, a magnetic tape, a floppy disk, an optical data storage device and the like.

It may be understood that in the disclosure, "a plurality of" refers to two or more than two, and other quantifiers are similar. "And/or" describes an association relationship of association objects, and represents that there may be three kinds of relationships, for example, A and/or B, may represent: A exists alone, A and B exist at the same time, and B exists alone. A character "/" generally represents that the previous and next association objects are in an "or" relationship. The singular forms "a", "the" and "this" are intended to include the plural forms as well, unless the context clearly indicates otherwise.

It is further understood that the terms "first", "second" and the like are configured to describe various information, but these information should not be limited to these terms. These terms are configured to distinguish the same type of information from one another, and do not imply a particular order or a level of importance. In fact, the expressions "first", "second" and the like may be used completely interchangeably. For example, in a case of not departing from the scope of the disclosure, a first message frame may also be called a second message frame, and similarly, the second message frame may also be called the first message frame.

It may be further understood that although in the examples of the disclosure, the operations are described in a specific order in the accompanying drawings, it should not be construed as requiring that the operations are executed in the specific order shown or a serial order, or that all the operations shown are executed to obtain desired results. In a certain circumstance, multitasking and parallel processing may be advantageous.

Those of skill in the art will easily figure out other implementation solutions of the disclosure after considering the specification and practicing the disclosure disclosed here. The present application intends to cover any transformation, usage or adaptive change of the disclosure, and these transformations, usages or adaptive changes conform to a general principle of the disclosure and include common general knowledge or conventional technical means in the technical field not disclosed by the disclosure. The specification and the examples are regarded as being for example.

It should be understood that the disclosure is not limited to the exact structure that has been described above and shown in the accompanying drawings, and that various modifications and changes may be made without departing from the scope of the disclosure. The scope of the disclosure is limited merely by the appended claims.

What is claimed is:

1. A coverage enhancement method, applied to a first terminal, the method comprising:
   determining data to be sent; and
   sending the data to be sent through a second terminal;
   when the first terminal and the second terminal jointly send data, the method further comprises: receiving a first scheduling instruction sent by a network device, wherein the first scheduling instruction is configured to schedule the first terminal to send uplink data; and the data to be sent are all or part of the uplink data scheduled by the first scheduling instruction; sending the data to be sent through the second terminal comprises: in response to the first scheduling instruction further comprising time-frequency resource location information for sending the data to be sent by the second terminal, sending the data to be sent and the time-frequency resource location information to the second terminal, and sending, through the second terminal, the data to be sent based on the time-frequency resource location information; or, sending the data to be sent to the second terminal, and sending, through the second terminal, the data to be sent based on a second scheduling instruction, wherein the second scheduling instruction is sent by the network device to the first terminal and the second terminal, and comprises first indication information for instructing the second terminal to assist the first terminal in sending the data to be sent.

2. The coverage enhancement method according to claim 1, when the first terminal send data with assistance of the second terminal, the data to be sent are uplink data to be sent by the first terminal.

3. The coverage enhancement method according to claim 2, wherein sending the data to be sent through the second terminal comprises:
   sending second indication information to the second terminal at a first preset resource location, wherein the second indication information is configured to instruct the second terminal to request an uplink transmission resource; and
   sending the data to be sent to the second terminal, and sending, through the second terminal, the data to be sent based on the uplink transmission resource requested according to the second indication information.

4. The coverage enhancement method according to claim 2, wherein sending the data to be sent through the second terminal comprises:
   sending the data to be sent to the second terminal at a second preset resource location, and caching the data to be sent through the second terminal; and
   sending third indication information to the second terminal upon receiving a scheduling instruction for scheduling the first terminal to send the data to be sent, wherein the third indication information is configured to instruct the second terminal to send the cached data to be sent.

5. The coverage enhancement method according to claim 1, wherein the data to be sent through the second terminal comprise identification information, and the identification information is configured to identify the data to be sent as data sent by the second terminal in cooperation with the first terminal.

6. The coverage enhancement method according to claim 5, wherein the identification information comprises a cooperative sending identity configured to represent cooperative sending of the data through the second terminal, a first terminal identity, or a data identity configured to represent that the data are data cooperatively sent.

7. A coverage enhancement apparatus, applied to a first terminal, the coverage enhancement apparatus comprising:
   a processor; and
   a memory for storing an executable instruction of the processor; wherein
   the processor is configured to execute the coverage enhancement method according to claim 1.

8. A coverage enhancement method, applied to a second terminal, the method comprising:
   obtaining data to be sent determined by a first terminal; and
   sending the data to be sent;
   when the first terminal and the second terminal jointly send data, the data to be sent are all or part of uplink data scheduled by a first scheduling instruction, and the first scheduling instruction is configured to schedule the first terminal to send the uplink data; sending the data to be sent comprises: in response to the first scheduling instruction further comprising time-frequency resource location information for sending the data to be sent by the second terminal, receiving the time-frequency resource location information send by the first terminal, and sending the data to be sent based on the time-frequency resource location information; or, in response to receiving a second scheduling instruction sent by a network device, sending the data to be sent based on first indication information comprised in the second scheduling instruction, wherein the second scheduling instruction is sent by the network device to the first terminal and the second terminal, and comprises the first indication information for instructing the second terminal to assist the first terminal in sending the data to be sent.

9. The coverage enhancement method according to claim 8, when the first terminal send data with assistance of the second terminal, the data to be sent are uplink data to be sent by the first terminal.

10. The coverage enhancement method according to claim 9, wherein sending the data to be sent comprises:
receiving second indication information sent by the first terminal at a first preset resource location, wherein the second indication information is configured to instruct the second terminal to request an uplink transmission resource; and
requesting the uplink transmission resource from a network device based on the second indication information, and sending the data to be sent based on the uplink transmission resource requested according to the second indication information.

11. The coverage enhancement method according to claim 9, wherein obtaining the data to be sent determined by the first terminal comprises:
receiving the data to be sent through the first terminal at a second preset resource location, and caching the data to be sent; and
sending the data to be sent comprises:
receiving third indication information sent by the first terminal, wherein the third indication information is sent by the first terminal upon receiving a scheduling instruction for scheduling the first terminal to send the data to be sent, and the third indication information is configured to instruct the second terminal to send the cached data to be sent; and
sending the cached data to be sent.

12. The coverage enhancement method according to claim 8, wherein the data to be sent through the second terminal comprise identification information, and the identification information is configured to identify the data to be sent as data sent by the second terminal in cooperation with the first terminal.

13. The coverage enhancement method according to claim 12, wherein the identification information comprises a cooperative sending identity configured to represent cooperative sending of the data through the second terminal, a first terminal identity, or a data identity configured to represent that the data are data cooperatively sent.

14. A coverage enhancement apparatus, applied to a second terminal, the coverage enhancement apparatus comprising:
a processor; and
a memory for storing an executable instruction of the processor; wherein
the processor is configured to execute the coverage enhancement method according to claim 8.

* * * * *